United States Patent
Yin

(10) Patent No.: US 6,418,404 B1
(45) Date of Patent: *Jul. 9, 2002

(54) SYSTEM AND METHOD FOR EFFECTIVELY IMPLEMENTING FIXED MASKING THRESHOLDS IN AN AUDIO ENCODER DEVICE

(75) Inventor: Lin Yin, Milpitas, CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,394

(22) Filed: Dec. 28, 1998

(51) Int. Cl.[7] ............................................... G10L 19/02
(52) U.S. Cl. ................................................... 704/200.1
(58) Field of Search ..................................... 704/200.1

(56) References Cited

U.S. PATENT DOCUMENTS

| | | | |
|---|---|---|---|
| 4,866,777 A | * 9/1989 | Mulla et al. | 704/206 |
| 5,014,318 A | 5/1991 | Schott et al. | 381/47 |
| 5,475,789 A | 12/1995 | Nishiguchi | 395/2 |
| 5,590,108 A | 12/1996 | Mitsuno et al. | 369/59 |
| 5,632,003 A | * 5/1997 | Davidson et al. | 704/200.1 |
| 5,651,093 A | 7/1997 | Nishiguchi | 395/2.38 |
| 5,677,994 A | 10/1997 | Miyamori et al. | 395/2.92 |
| 5,809,454 A | * 9/1998 | Okada et al. | 704/214 |
| 6,138,101 A | * 10/2000 | Fujii | 704/500 |

FOREIGN PATENT DOCUMENTS

| | | | |
|---|---|---|---|
| EP | 0424016 A | 10/1990 | H04B/1/66 |
| EP | 0855805 A | 7/1998 | H04B/1/66 |

OTHER PUBLICATIONS

Peter Noll, Wideband Speech And Audio Coding, IEEE, vol. 31, No. 11, Nov., 1993, pp. 34–44.

Davis Pan, A Tutorial On Mpeg/Audio Compression, IEEE, vol. 2 No. 2, Jan., 1995, pp. 60–74.

* cited by examiner

Primary Examiner—Tālivaldis Ivars Šmits
(74) Attorney, Agent, or Firm—Gregory J. Koerner; Simon & Koerner LLP

(57) ABSTRACT

A system and method for effectively implementing fixed masking thresholds in an audio encoder device comprises a filter bank for filtering source audio data to produce frequency sub-bands, a lookup table for storing masking threshold corresponding to the frequency sub-bands, and a bit allocator for using the masking thresholds to identify and discard masked audio data to thereby reduce the total amount of audio data that requires processing.

42 Claims, 8 Drawing Sheets

SYSTEM AND METHOD FOR EFFECTIVELY IMPLEMENTING FIXED MASKING THRESHOLDS IN AN AUDIO ENCODER DEVICE

CROSS-REFERENCE TO RELATED APPLICATIONS

The present application is related to U.S. applications Ser. No. 09/128,924, entitled "System And Method For Implementing A Refined Psycho-Acoustic Modeler," filed on Aug. 4, 1998, which has since issued on Oct. 3, 2000 as U.S. Pat. No. 6,128,593, and to U.S. Patent application Ser. No. 09/150,117, entitled "System And Method For Efficiently Implementing A Masking Function In A Psycho-Acoustic Modeler," filed Sep. 9, 1998, which has since issued on Feb. 27, 2001 as U.S. Pat. No. 6,195,633, and also to co-pending U.S. patent application Ser. No. 09/220,320, entitled "System And Method For Preventing Artifacts In An Audio Decoder Device," filed on Dec. 24, 1998, which are hereby incorporated by reference. The foregoing related applications are commonly assigned.

BACKGROUND OF THE INVENTION

1. Field of the Invention

This invention relates generally to signal processing systems, and relates more particularly to a system and method for effectively implementing fixed masking thresholds in an audio encoder device.

2. Description of the Background Art

Providing an effective method of encoding audio data is often a significant consideration for designers, manufacturers, and users of contemporary electronic systems. Developments in modern digital audio technology have necessitated corresponding improvements in sophisticated, high-performance audio encoding methodologies. For example, the operation of recordable audio compact-disc devices typically requires an encoder-decoder (codec) system to receive and encode source audio data into a format (such as MPEG) that may then be recorded onto appropriate media using the compact-disc device.

Referring now to FIG. 1, a block diagram for one embodiment of an audio encoder-decoder (codec) 110 is shown. In the FIG. 1 embodiment, codec 110 comprises a decoder 114 and an encoder 112 that includes a psycho-acoustic modeler (PAM) 126. During an encoding operation, encoder 112 receives source audio data from any compatible audio source via path 116, responsively filters the source audio into frequency sub-bands, and then generates encoded audio data that may be provided to an audio device (such as a recordable compact-disc device or a computer system) via path 138. The operation of psycho-acoustic modeler (PAM) 126 is further discussed below in conjunction with FIG. 2.

Referring now to FIG. 2, a graph 210 for one embodiment of exemplary masking thresholds for the FIG. 1 encoder-decoder system 110 is shown. Graph 210 displays audio data signal energy on vertical axis 212, and also displays a series of frequency sub-bands on horizontal axis 214. In operation,. psycho-acoustic modeler (PAM) 126 receives source audio data, and then utilizes characteristics of human hearing to generate the masking thresholds 228. Experiments have determined that human hearing cannot detect some sounds of lower energy when those lower energy sounds are close in frequency to sounds of higher energy.

For example, sub-band 3 (220) includes a 60 db sound 232, a 30 db sound 234, and a masking threshold 230 of 36 db. The 30 db sound 234 falls below masking threshold 230, and is therefore not detectable by the human ear due to the masking effect of the 60 db sound 232. In practice, encoder 112 may thus discard any sounds that fall below masking thresholds 228 to advantageously reduce the amount of audio data and expedite the encoding process.

Psycho-acoustic modeler 126 thus provides useful information for reducing the amount of audio data that must be encoded by encoder 112. However, implementing psycho-acoustic modeler 126 within encoder 112 substantially increases the complexity of encoder 112, and also approximately doubles the processing power required to control encoder 112. The cost and difficulty of successfully implementing psycho-acoustic modeler 126 are therefore significant negative aspects of the FIG. 1 encoder-decoder system 110. An encoder device that exhibits reduced complexity, while still achieving acceptable quality in the encoded audio data would thus provide distinct advantages to system manufacturers and users. Therefore, for all the foregoing reasons, an improved system and method are needed to effectively implement fixed masking thresholds in an audio encoder device.

SUMMARY OF THE INVENTION

In accordance with the present invention, a system and method are disclosed for effectively implementing fixed masking thresholds in an audio encoder device. In one embodiment of the present invention, system designers of the encoder initially create a masking threshold lookup table. The masking threshold lookup table may include masking threshold values that are based upon empirically-derived absolute human hearing thresholds. In alternate embodiments, the lookup table may similarly include masking thresholds that are selectively tuned to deviate from the absolute human hearing thresholds.

Next, a filter bank in the encoder receives and filters source audio data into frequency sub-bands to provide filtered audio data to a bit allocator. The bit allocator then responsively analyzes the filtered audio data using the masking thresholds contained in the lookup table. Specifically, the bit allocator identifies masked audio data to be any filtered audio data that falls below the fixed masking thresholds from the lookup table. Similarly, the bit allocator identifies any filtered audio data that lies above the fixed masking thresholds in the lookup table as non-masked audio data.

The bit allocator may then discard the filtered audio data that was identified as masked audio data to advantageously decrease the total amount of filtered audio data to be processed by the encoder. Next, the bit allocator allocates all available allocation bits to the filtered audio data that was previously identified as non-masked audio data to generate allocated audio data to a quantizer.

In response, the quantizer quantizes the allocated audio data to generate quantized audio data to a bitstream packer. Finally, the bitstream packer packs the quantized audio data to produce encoded audio data for storage onto an appropriate and compatible storage medium, in accordance with the present invention. The present invention thus efficiently and effectively provides a system and method for effectively implementing fixed masking thresholds in an audio encoder device.

DETAILED DESCRIPTION OF THE PREFERRED EMBODIMENT

The present invention relates to an improvement in signal processing systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises an encoder device that includes a filter bank for filtering source audio data to produce frequency sub-bands, a lookup table for storing masking threshold corresponding to the frequency sub-bands, and a bit allocator for using the masking thresholds to identify and discard masked audio data to thereby reduce the total amount of audio data that requires processing by the encoder device.

Figure 1:
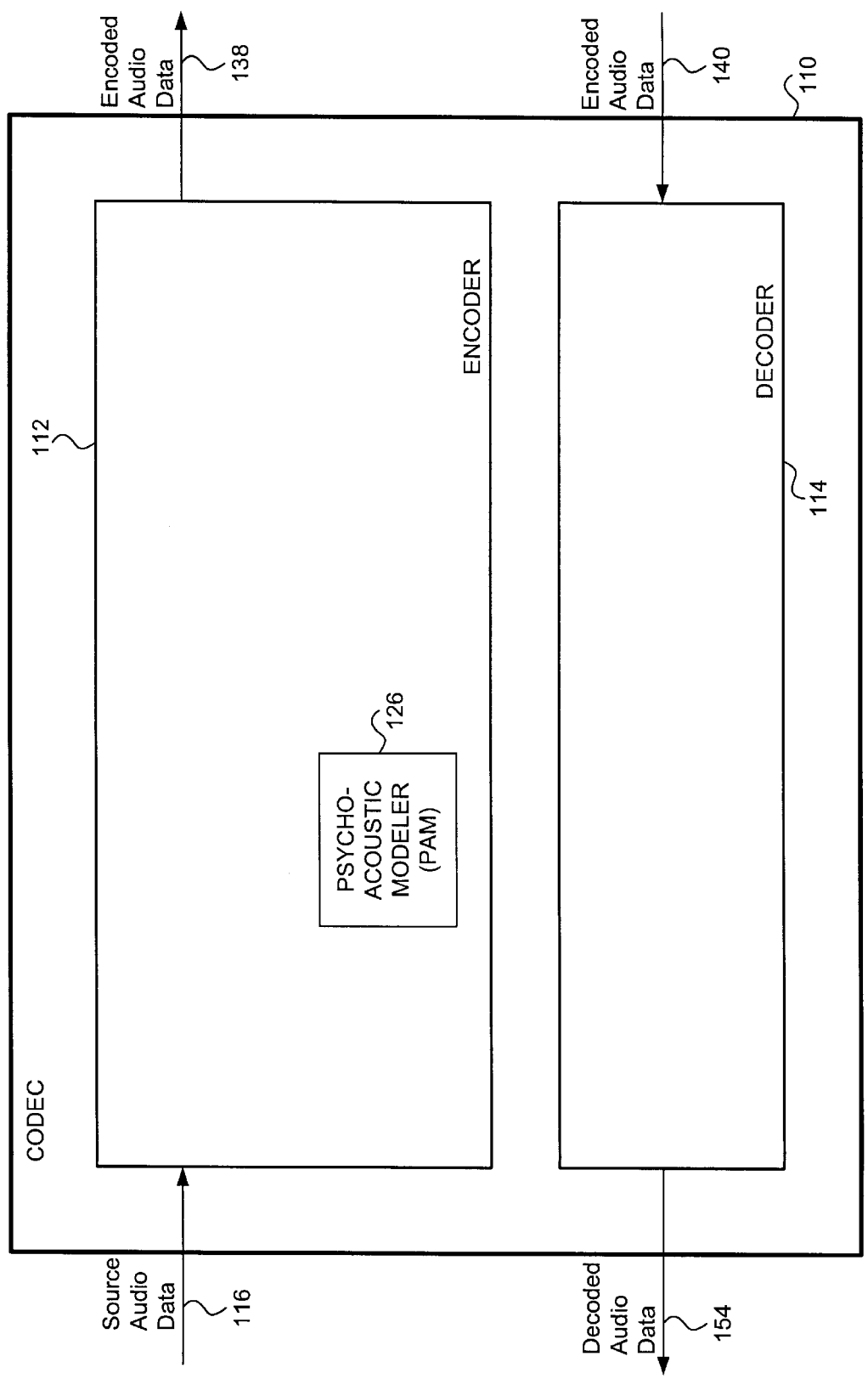
FIG. 1 is a block diagram for one embodiment of an audio encoder-decoder system.
Figure 2:
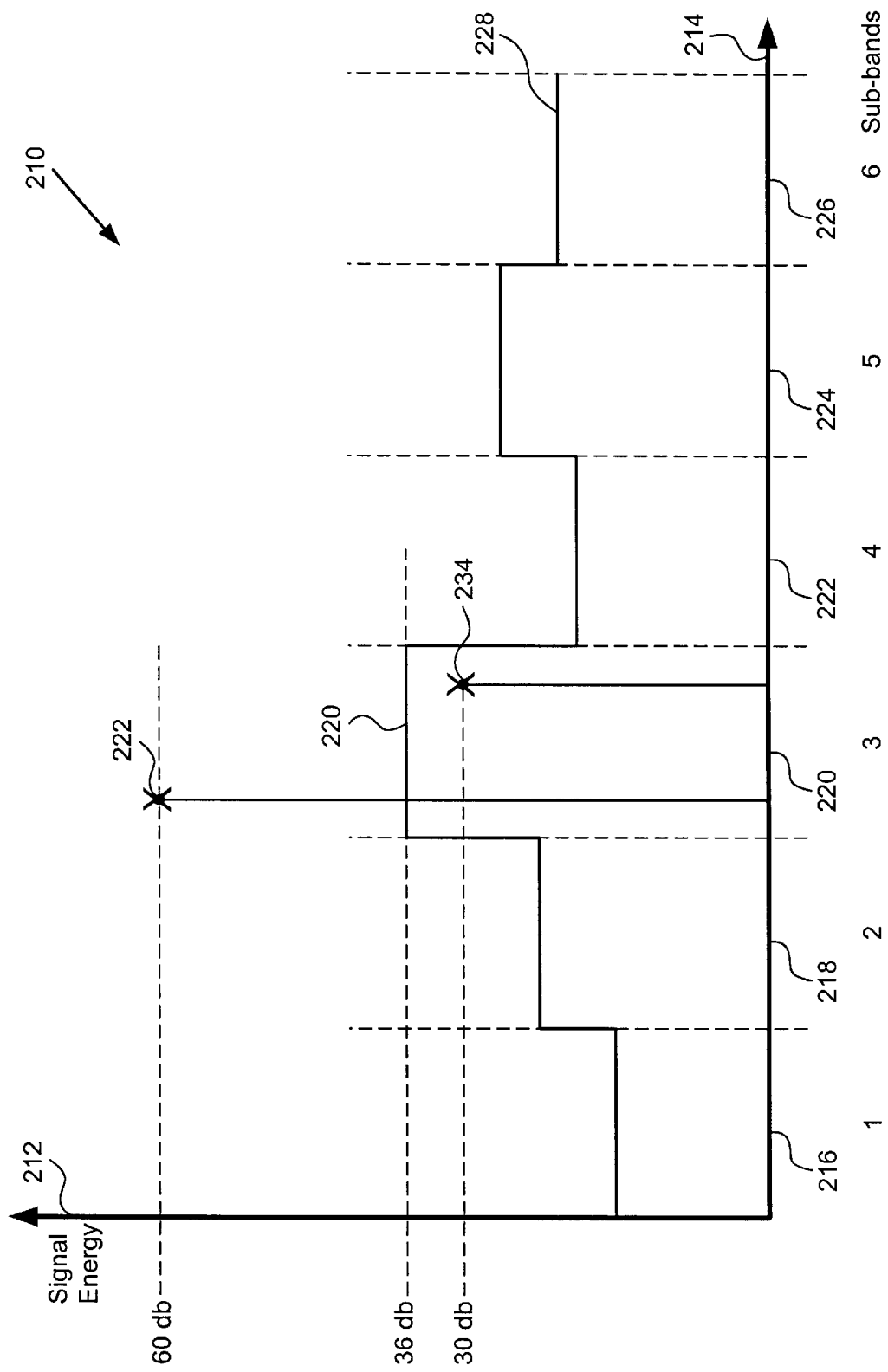
FIG. 2 is a graph for one embodiment of exemplary masking thresholds for the FIG. 1 encoder-decoder system.
Figure 3:
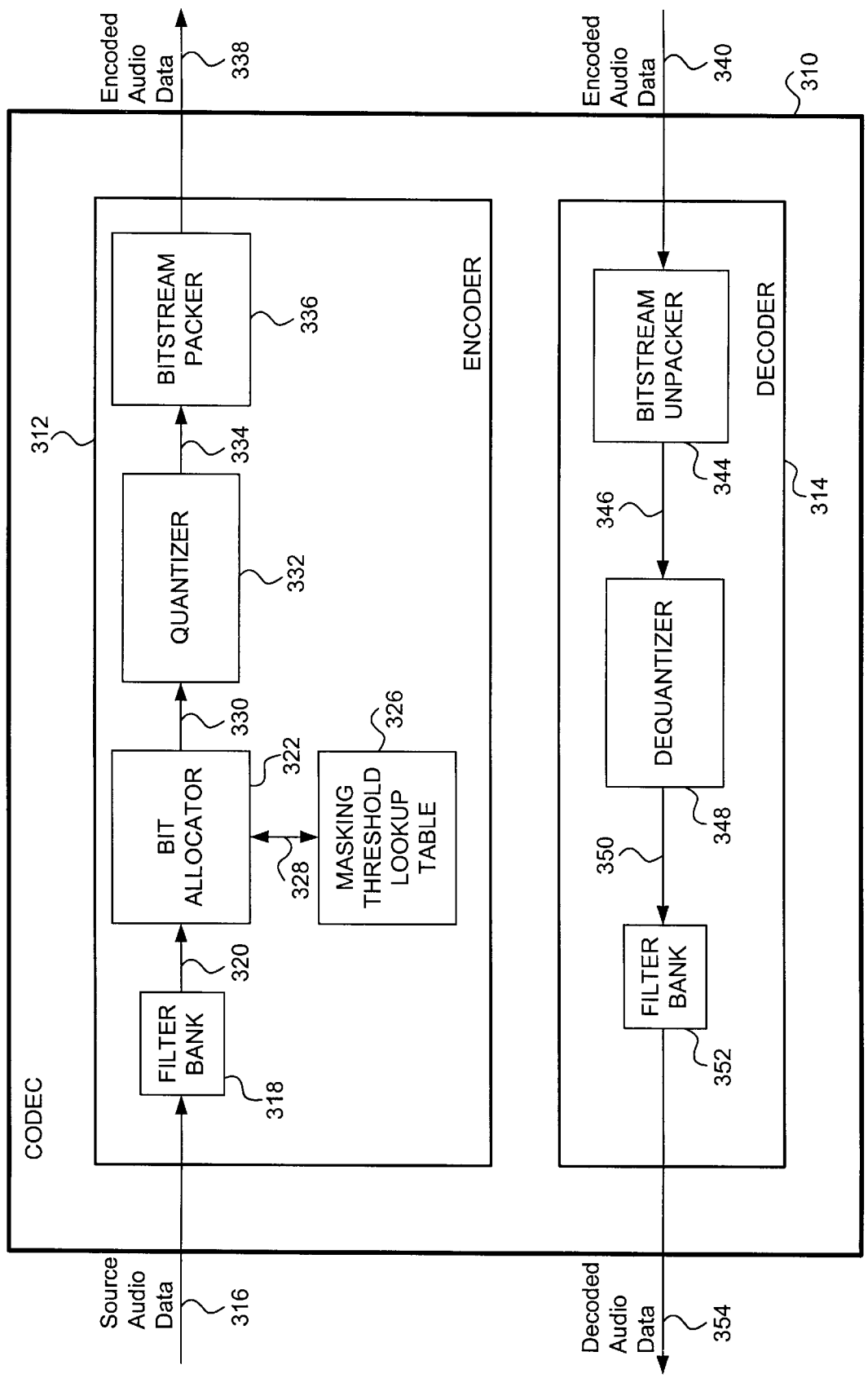
FIG. 3 is a block diagram for one embodiment of an encoder-decoder system, in accordance with the present invention.

Referring now to FIG. 3, a block diagram for one embodiment of an encoder-decoder (codec) 310 is shown, in accordance with the present invention. In the FIG. 3 embodiment, codec 310 comprises an encoder 312, and a decoder 314. Encoder 312 preferably includes a filter bank 318, a masking threshold lookup table 326, a bit allocator 322, a quantizer 332, and a bitstream packer 336. Decoder 314 preferably includes a bitstream unpacker 344, a dequantizer 348, and a filter bank 352.

In the FIG. 3 embodiment, encoder 312 and decoder 314 preferably function in response to a set of program instructions called an audio manager that is executed by a processor device (not shown). In alternate embodiments, encoder 312 and decoder 314 may also be implemented and controlled using appropriate hardware configurations. The FIG. 3 embodiment specifically discusses encoding and decoding digital audio data, however the present invention may advantageously be utilized to process and manipulate other types of electronic information.

During an encoding operation, encoder 312 receives source audio data from any compatible audio source via path 316. In the FIG. 3 embodiment, the source audio data on path 316 includes digital audio data that is preferably formatted in a linear pulse code modulation (LPCM) format.

Encoder 312 preferably processes 16-bit digital samples of the source audio data in units called "frames". In the preferred embodiment, each frame contains 1152 samples.

In practice, filter bank 318 receives and separates the source audio data into a set of discrete frequency sub-bands to generate filtered audio data. In the FIG. 3 embodiment, the filtered audio data from filter bank 318 preferably includes thirty-two unique and separate frequency sub-bands. Filter bank 318 then provides the filtered audio data (sub-bands) to bit allocator 322 via path 320.

Bit allocator 322 then accesses relevant information from lookup table 326 via path 328, and responsively generates allocated audio data to quantizer 332 via path 330. Bit allocator 322 creates the allocated audio data by assigning binary digits (bits) to represent the signal contained in each of the sub-bands received from filter bank 318. The functionality of lookup table 326 and bit allocator 322 are further discussed below in conjunction with FIGS. 5–8.

Next, quantizer 332 compresses and codes the allocated audio data to generate quantized audio data to bitstream packer 336 via path 334. Bitstream packer 336 responsively packs the quantized audio data to generate encoded audio data that may then be provided to an audio device (such as a recordable compact disc device or a computer system) via path 338.

During a decoding operation, encoded audio data is provided from an audio device to bitstream unpacker 344 via path 340. Bitstream unpacker 344 responsively unpacks the encoded audio data to generate quantized audio data to dequantizer 348 via path 346. Dequantizer 348 then dequantizes the quantized audio data to generate dequantized audio data to filter bank 352 via path 350. Filter bank 352 responsively filters the dequantized audio data to generate and provide decoded audio data to an audio playback system via path 354.

Figure 4:
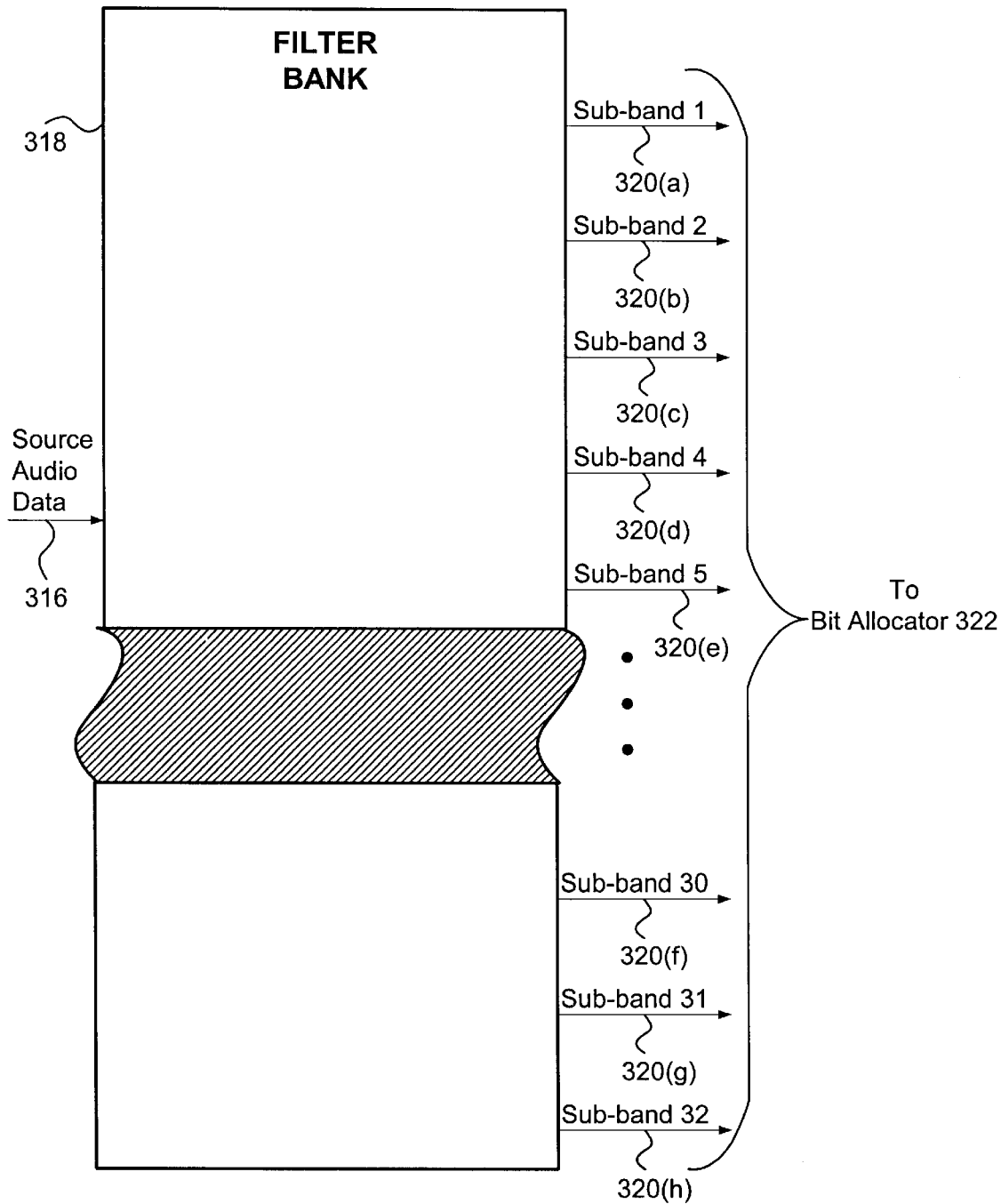
FIG. 4 is a block diagram for one embodiment of the encoder filter bank of FIG. 3, in accordance with the present invention.

Referring now to FIG. 4, a block diagram for one embodiment of the FIG. 3 encoder filter bank 318 is shown, in accordance with the present invention. In the FIG. 4 embodiment, filter bank 318 receives source audio data from a compatible audio source via path 316. Filter bank 318 then responsively divides the received source audio data into a series of frequency sub-bands that are each provided to bit allocator 322. The FIG. 4 embodiment preferably generates thirty two sub-bands 320(*a*) through 320(*h*), however, in alternate embodiments, filter bank 318 may readily output a greater or lesser number of sub-bands.

Figure 5:
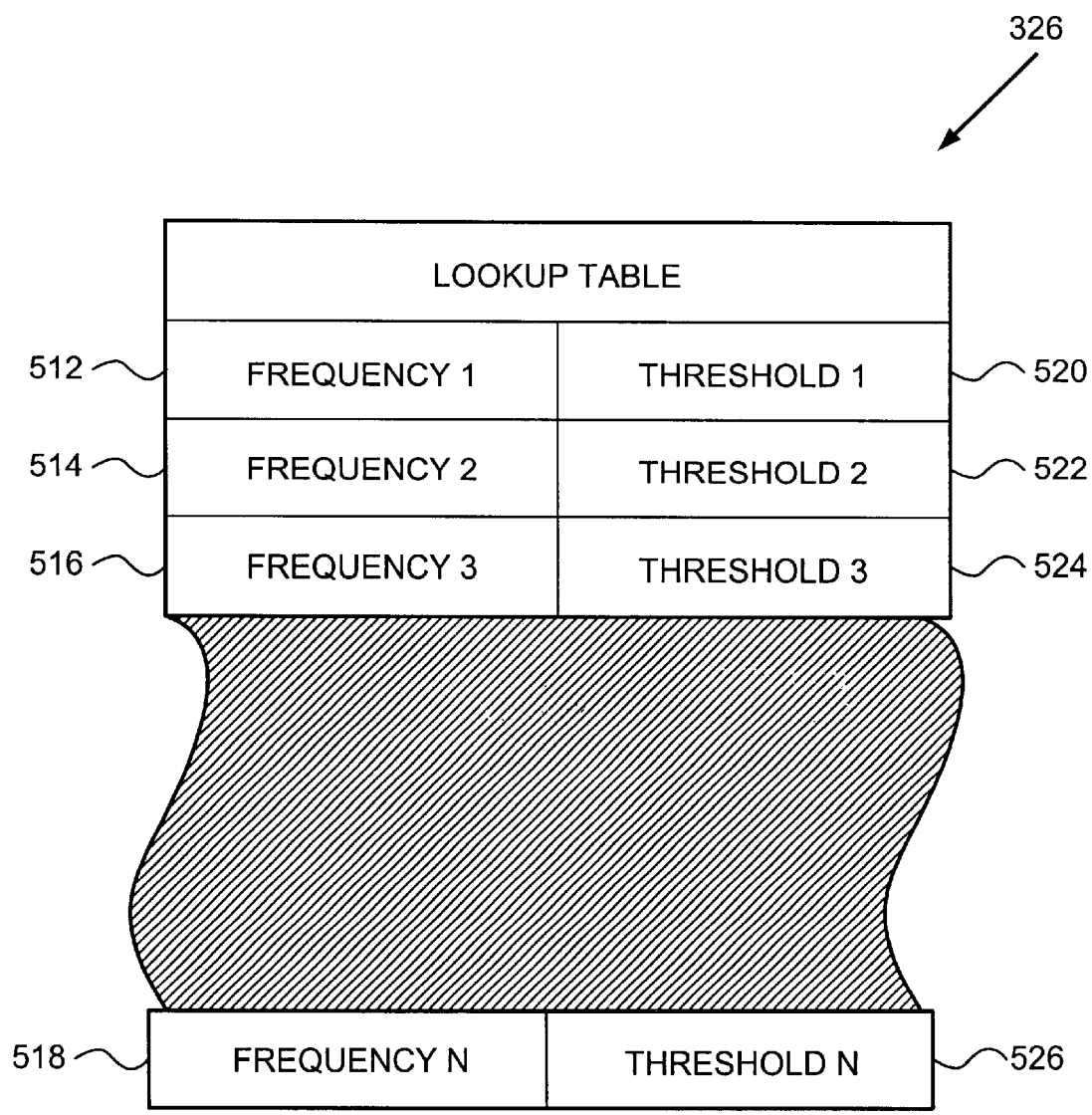
FIG. 5 is a block diagram for one embodiment of the masking threshold lookup table of FIG. 3, in accordance with the present invention.

Referring now to FIG. 5, a block diagram for one embodiment of the FIG. 3 masking threshold lookup table 326 is shown, in accordance with the present invention. In other embodiments of the present invention, lookup table 326 may readily be implemented using any other appropriate and compatible data structure. In the FIG. 5 embodiment, lookup table 326 includes a frequency 1 (512) through a frequency N (518), and a masking threshold 1 (520) through a masking threshold N (526). In the FIG. 5 embodiment, each frequency 512 through 518 uniquely corresponds with an individual masking threshold 520 through 526. For example, frequency 1 (512) corresponds to masking threshold 1 (520), and frequency N (518) corresponds to masking threshold N (526).

In the FIG. 5 embodiment, frequencies 512 through 518 may represent the individual frequency sub-bands generated by filter 318, or, alternately, may represent individual frequencies from the filtered audio data generated by filter bank 318. In practice, bit allocator 322 may thus identify a particular frequency or a frequency sub-band 512 through 518 contained in the filtered audio data received from filter bank 318. Bit allocator 322 may then access the masking threshold 520 through 526 that correspond to the particular frequency or frequency sub-band by referencing lookup table 326.

Bit allocator 322 may then advantageously identify and discard any masked audio data (from the filtered audio data) that falls below the masking thresholds 520 through 526. Implementing encoder 312 with masking threshold lookup table 326 thus significantly reduces the overall complexity of encoder 312, while still preserving the benefits of utilizing masking thresholds.

Figure 6:
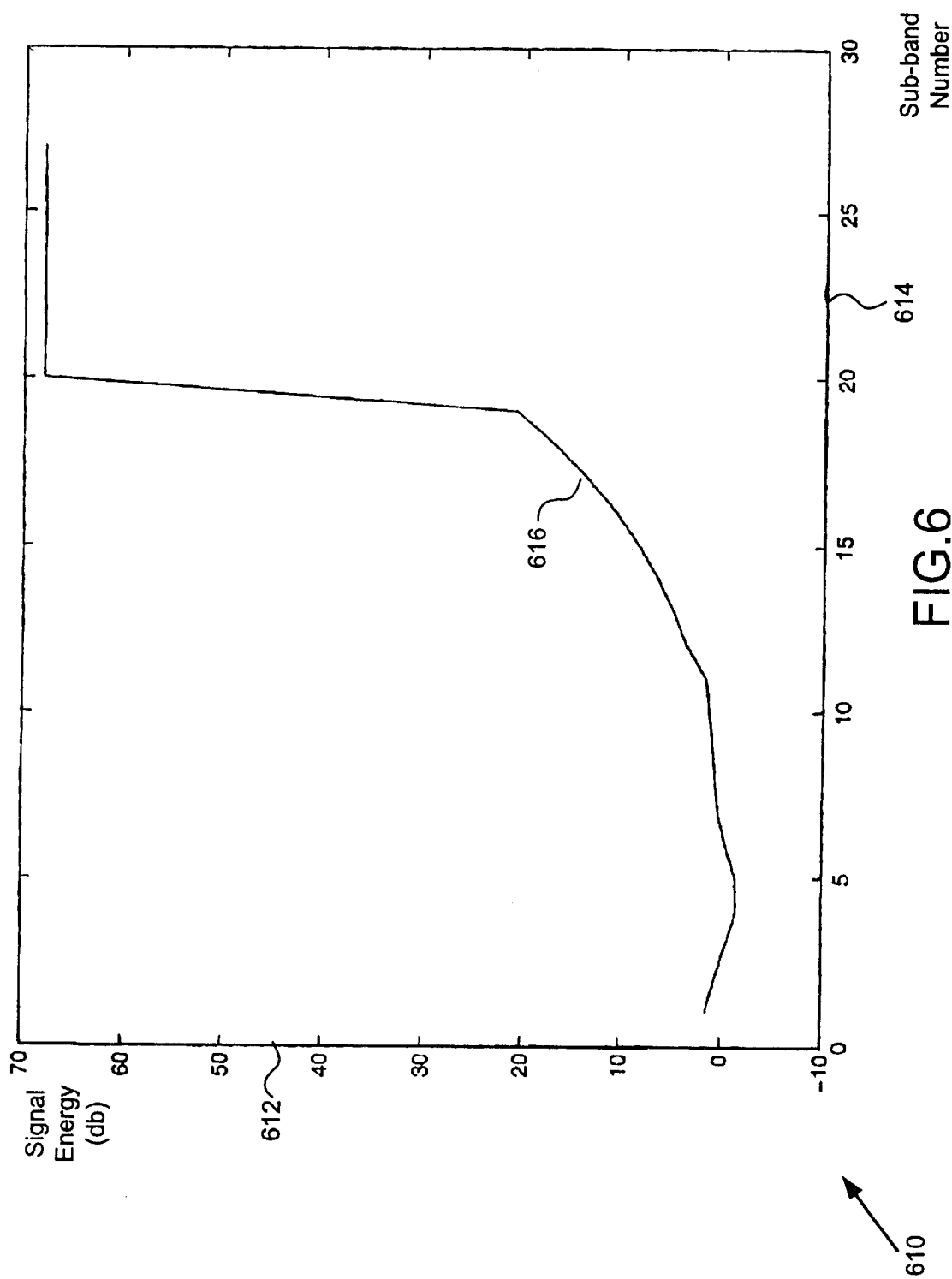
FIG. 6 is a graph showing absolute hearing thresholds, in accordance with the present invention.

Referring now to FIG. 6, a graph 610 illustrating absolute hearing thresholds 616 is shown, in accordance with the present invention. In FIG. 6, graph 610 displays audio data signal energy in decibels on vertical axis 612. Graph 610 also displays frequency sub-bands (generated by filter bank 318) on horizontal axis 614.

In graph 610, absolute hearing thresholds 616 represent empirically determined limits of human hearing. In other words, human hearing does not detect sound energy that falls below absolute hearing thresholds 616. In selected embodiments of the present invention, masking thresholds 520 through 526 of lookup table 326 (FIG. 5) are defined with reference to absolute hearing thresholds 616. For example, masking thresholds 520 through 526 may be substantially equal to absolute hearing thresholds 616.

In other embodiments of the present invention, selected segments of absolute hearing thresholds 616 may advantageously be altered or "tuned" to achieve improved performance of encoder 312. For example, selected higher frequency sub-bands may be represented in lookup table 326 by using corresponding masking thresholds that are tuned to threshold values which are higher than those corresponding thresholds contained in absolute hearing thresholds 616. This tuning of lookup table 326 (for the selected higher frequency sub-bands) may thus facilitate optimal allocation of available allocation bits by bit allocator 322, while still maintaining high quality in the encoded audio data.

Figure 7:
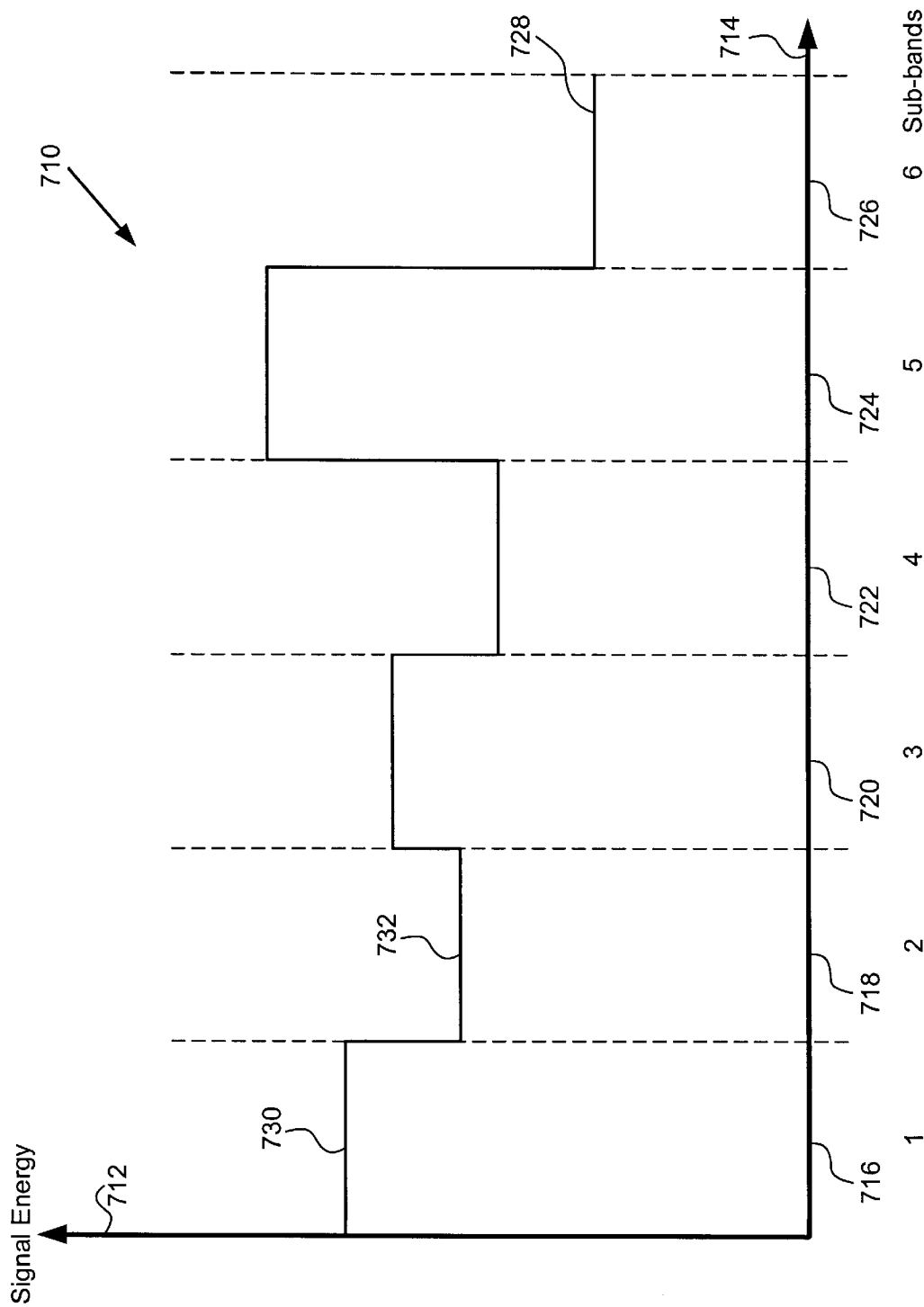
FIG. 7 is a graph for one embodiment of exemplary fixed masking thresholds, in accordance with the present invention.

Referring now to FIG. 7, a graph 710 for one embodiment of exemplary fixed masking thresholds is shown, in accordance with the present invention. Graph 710 displays audio data signal energy on vertical axis 712, and also displays a series of frequency sub-bands on horizontal axis 714. Graph 710 is presented to illustrate principles of the present invention, and therefore, the values shown in graph 710 are intended as examples only. The present invention may thus readily function with operational values other than those presented in graph 710 of FIG. 7.

In FIG. 7, graph 710 includes sub-band 1 (716) through sub-band 6 (726), and masking threshold values 728 that change for each FIG. 7 sub-band. In practice, bit allocator 322 initially receives frequency sub-band 1 (716) from filter bank 318, and responsively accesses corresponding masking threshold 730 by referencing lookup table 326. Bit allocator 322 may then advantageously identify and discard any masked audio data from sub-band 1 (716) that falls below masking threshold 730

Bit allocator 322 next similarly accesses and utilizes masking threshold 732 in connection with sub-band 2 (718) to identify and discard any masked audio data. Bit allocator 322 then continues to sequentially access and utilize masking thresholds for individual sub-bands until a current frame is complete. The foregoing process is repeated for each frame of audio data until all frames have been processed by encoder 312.

Figure 8:
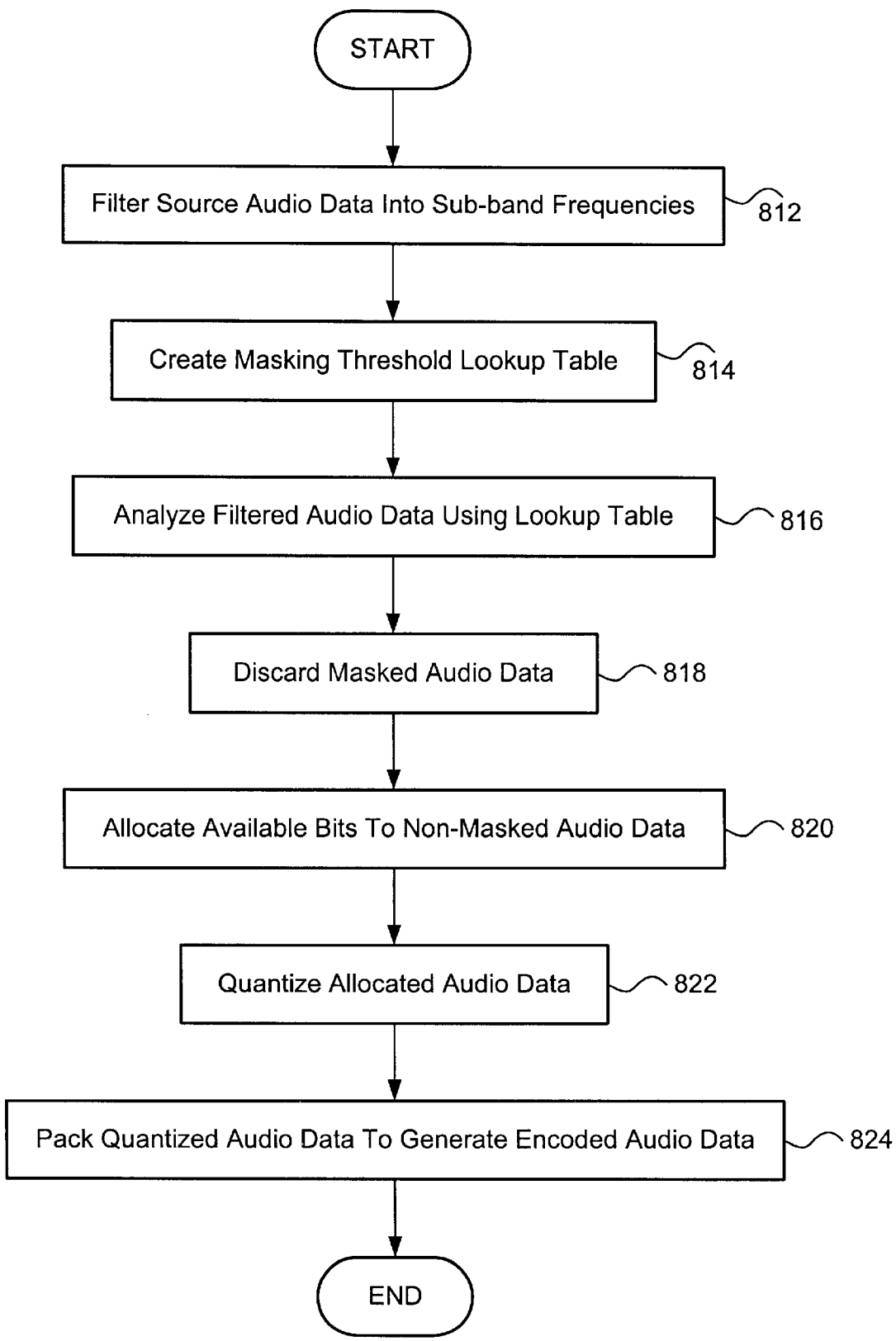
FIG. 8 is a flowchart of method steps for one embodiment to effectively implement fixed masking thresholds, in accordance with the present invention.

Referring now to FIG. 8, a flowchart of method steps for one embodiment to effectively implement fixed masking thresholds is shown, in accordance with the present invention. Initially, in step 812, filter bank 318 of encoder 312 receives and filters source audio data into frequency sub-bands to provide filtered audio data to bit allocator 322.

Next, in step 814, system designers of encoder 312 create a masking threshold lookup table 326. The contents and functionality of the lookup table 326 are discussed above in conjunction with FIGS. 3 and 5–7. Then, in step 816, bit allocator 322 analyzes the filtered audio data using the fixed masking thresholds contained in lookup table 326, as discussed above in conjunction with FIGS. 3 and 5–7. Specifically, bit allocator 322 identifies any filtered audio data that falls below the fixed masking thresholds in lookup table 326 as masked audio data. Similarly, bit allocator 322 identifies any filtered audio data that lies above the fixed masking thresholds in lookup table 326 as non-masked audio data.

Then, in step 818, bit allocator 322 may advantageously disregard or discard the filtered audio data that was identified as masked audio data in the preceding step 816. In step 820, bit allocator 322 next allocates all available allocation bits to the filtered audio data that was identified as non-masked audio data (in foregoing step 816) to generate allocated audio data to quantizer 332. In one embodiment of the present invention, the step 820 bit allocation process may be performed using similar techniques to those disclosed in co-pending U.S. patent application Ser. No. 09/220320, entitled "System And Method For Preventing Artifacts In An Audio Decoder Device," filed on Dec. 24, 1998, which is hereby incorporated by reference.

In step 822, quantizer responsively quantizes the allocated audio data to generate quantized audio data to bitstream packer 336. Finally, in step 824, bitstream packer 336 packs the quantized audio data to produce encoded audio data for storage onto an appropriate and compatible storage medium, in accordance with the present invention.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for processing information, comprising:
    a data structure configured to generate masking thresholds that correspond to source data, said data structure comprising a lookup table that includes said masking thresholds; and
    a bit allocator configured to convert said source data into non-masked data by referencing said masking thresholds, wherein said source data comprises digital data.

2. The system of claim 1 wherein said data structure and said bit allocator form part of an encoder device for encoding source audio data into encoded audio data.

3. The system of claim 2 wherein said source audio data is received in a linear pulse-code modulation format and is encoded by said encoder device to generate encoded audio data in an MPEG format.

4. The system of claim 2 wherein said encoder device sequentially processes frames of said source audio data, said frames comprising data samples.

5. The system of claim 4 wherein a filter bank receives said frames, and responsively generates sub-bands for each of said frames.

6. The system of claim 5 wherein said sub-bands include thirty-two frequency sub-bands.

7. The system of claim 5 wherein said data structure comprises said lookup table that includes said masking thresholds which each correspond to one of said frequency sub-bands.

8. The system of claim 7 wherein said masking thresholds represent signal energy levels below which said filtered audio data is not processed by said bit allocator.

9. The system of claim 7 wherein said masking thresholds of said lookup table are tuneably based upon absolute human hearing thresholds.

10. The system of claim 2 wherein said bit allocator generates allocated data to a quantizer, said quantizer responsively providing quantized audio data to a bitstream packer that then produces said encoded audio data.

11. A method for processing information, comprising the steps of:
    generating masking thresholds from a data structure, said masking thresholds corresponding to source data, said data structure comprising a lookup table that includes said masking thresholds; and
    converting said source data with a bit allocator to produce non-masked data by referencing said data structure, wherein said source data comprises digital data.

12. The method of claim 11 wherein said data structure and said bit allocator form part of an encoder device for encoding source audio data into encoded audio data.

13. The method of claim 12 wherein said source audio data is received in a linear pulse-code modulation format and is encoded by said encoder device to generate encoded audio data in an MPEG format.

14. The method of claim 12 wherein said encoder device sequentially processes frames of said source audio data, said frames comprising data samples.

15. The method of claim 14 wherein a filter bank receives said frames, and responsively generates sub-bands for each of said frames.

16. The method of claim 15 wherein said sub-bands include thirty-two frequency sub-bands.

17. The method of claim 15 wherein said data structure comprises said lookup table that includes said masking thresholds which each correspond to one of said frequency sub-bands.

18. The method of claim 17 wherein said masking thresholds represent signal energy levels below which said filtered audio data is not processed by said bit allocator.

19. The method of claim 17 wherein said masking thresholds of said lookup table are tuneably based upon absolute human hearing thresholds.

20. The method of claim 12 wherein said bit allocator generates allocated data to a quantizer, said quantizer responsively providing quantized audio data to a bitstream packer that then produces said encoded audio data.

21. A system for preventing artifacts, comprising:
    means for generating masking thresholds, said masking thresholds corresponding to source data, said means for generating comprising a lookup table that includes said masking thresholds; and
    means for converting said source data into non-masked data by referencing said masking thresholds, wherein said source data comprises digital data.

22. A computer-readable medium comprising program instructions for processing information by performing the steps of:
    generating masking thresholds from a data structure, said masking thresholds corresponding to source data, said data structure comprising a lookup table that includes said masking thresholds; and
    converting said source data with a bit allocator to produce non-masked data by referencing said data structure, wherein said source data comprises digital data.

23. The computer-readable medium of claim 22 wherein said masking thresholds from said data structure are based upon absolute human hearing thresholds below which sound energy is not detectable by human hearing.

24. The computer-readable medium of claim 23 wherein said masking thresholds are selectably tuned to vary from said absolute human hearing thresholds.

25. The computer-readable medium of claim 24 wherein said masking thresholds are tuned higher than said absolute human hearing thresholds only in a high frequency segment.

26. The computer-readable medium of claim 22 wherein said bit allocator accesses said data structure to determine said masking thresholds corresponding to said source data, and responsively discards masked data that falls below said masking thresholds.

27. The computer-readable medium of claim 22 wherein said data structure and said bit allocator form part of an encoder device within a recordable digital compact disc system.

28. The computer-readable medium of claim 22 wherein said data structure and said bit allocator are controlled by an audio manager program.

29. The computer-readable medium of claim 28 wherein said audio manager program is executed by a processor device.

30. A system for efficiently implementing an encoder device, comprising:
    a filter bank coupled to said encoder device, said filter bank being configured to receive digital audio input data, and responsively generate filtered audio data that includes a series of frequency subbands;
    a masking-threshold lookup table coupled to said encoder device, said masking-threshold lookup table including a series of selectable masking thresholds that each uniquely corresponds to a different one of said frequency subbands, said selectable masking thresholds collectively forming an amplitude-versus-frequency graph that includes a tunable segment which may be altered from an empirically-determined absolute hearing threshold curve to emphasize or de-emphasize said frequency subbands in said tunable segment; and
    a bit allocator configured to compare said filtered audio data from each of said frequency subbands to a corresponding one of said selectable masking thresholds, said bit allocator generating allocated audio data by allocating available allocation bits on a subband-by-subband basis only to unmasked audio data from said each of said frequency subbands that has an amplitude which is greater than said corresponding one of said selectable masking thresholds.

31. The system of claim 30 wherein said encoder device forms part of a codec system which also includes a decoder device, said encoder device further comprising a quantizer that quantizes said allocated audio data to provide quantized audio data to a bitstream packer which responsively processes said quantized audio data to generate encoded audio data, said decoder device including a bitstream unpacker, a dequantizer, and a filter bank which operate to produce decoded audio data.

32. The system of claim 30 wherein said encoder device utilizes said filter bank, said masking-threshold lookup table, and said bit allocator to process different types of electronic information other than said digital audio input data.

33. The system of claim 30 wherein said digital audio input data is transmitted to said encoder device from a digital data source, said digital audio input data being formatted in a linear pulse code modulation format, said encoder device responsively processing 16-bit digital samples of said digital audio input data in frame units that each have 1,152 of said 16-bit digital samples.

34. The system of claim 30 wherein said selectable masking thresholds each uniquely correspond to a different discrete frequency from said digital audio input data instead of corresponding to said frequency subbands, said bit allocator responsively generating said allocated audio data by allocating available allocation bits only to said unmasked audio data that is greater than said corresponding one of said selectable masking thresholds.

35. The system of claim 30 wherein said tuneable segment forms one or more subsidiary portions of said amplitude-versus-frequency graph, said tuneable segment thus not entirely encompassing said amplitude-versus-frequency graph.

36. The system of claim 30 wherein said tuneable segment is comprised only of higher-frequency subbands which are represented in said masking-threshold lookup table by utilizing corresponding tuned masking thresholds which are greater than those from said empirically-determined absolute hearing threshold curve.

37. The system of claim 30 wherein said tuneable segment includes multiple non-contiguous portions of said amplitude-versus-frequency graph, said multiple non-contiguous portions not comprising all of said amplitude-versus-frequency graph.

38. The system of claim 30 wherein said selectable masking thresholds from said tuneable segment are specifically selected to conserve said available allocation bits, while still maintaining desired audio characteristics of said allocated audio data.

39. The system of claim 30 wherein each of said frequency subbands corresponds only to a single fixed one of said selectable masking thresholds in said masking-threshold lookup table.

40. The system of claim 30 wherein said filter bank accesses said digital audio input data, and responsively generates exactly thirty-two frequency subbands.

41. A method for efficiently implementing an encoder device, comprising the steps of:

receiving digital audio input data with a filter bank that responsively generates filtered audio data that includes a series of frequency subbands;

providing a masking-threshold lookup table that includes a series of selectable masking thresholds that each uniquely corresponds to a different one of said frequency subbands, said selectable masking thresholds collectively forming an amplitude-versus-frequency graph that includes a tunable segment which may be altered from an empirically-determined absolute hearing threshold curve to emphasize or de-emphasize said frequency subbands in said tunable segment; and comparing said filtered audio data from each of said frequency subbands to a corresponding one of said selectable masking thresholds with a bit allocator that generates allocated audio data by allocating available allocation bits on a subband-by-subband basis only to unmasked audio data in said each of said frequency subbands which has an amplitude that is greater than said corresponding one of said selectable masking thresholds.

42. A system for efficiently implementing an encoder device, comprising:

means for receiving digital audio input data, and responsively generating filtered audio data that includes a series of frequency subbands;

means for providing a masking-threshold lookup table that includes a series of selectable masking thresholds that each uniquely corresponds to a different one of said frequency subbands, said selectable masking thresholds collectively forming an amplitude-versus-frequency graph that includes a tunable segment which may be altered from an empirically-determined absolute hearing threshold curve to emphasize or de-emphasize said frequency subbands in said tunable segment; and means for comparing said filtered audio data from each of said frequency subbands to a corresponding one of said selectable masking thresholds, and generating allocated audio data by allocating available allocation bits on a subband-by-subband basis only to unmasked audio data in said each of said frequency subbands which has an amplitude that is greater than said corresponding one of said selectable masking thresholds.

* * * * *